United States Patent
Kawase et al.

(10) Patent No.: US 7,557,766 B2
(45) Date of Patent: Jul. 7, 2009

(54) PORTABLE REMOTE CONTROLLER FOR TIRE STATUS DETECTOR

(75) Inventors: Shinichi Kawase, Ichinomiya (JP); Takashi Takeyama, Ichinomiya (JP); Syuji Aoyama, Kani (JP)

(73) Assignee: Pacific Industrial Co., Ltd., Ogaki (JP)

(*) Notice: Subject to any disclaimer, the term of this patent is extended or adjusted under 35 U.S.C. 154(b) by 0 days.

(21) Appl. No.: 12/073,256

(22) Filed: Mar. 3, 2008

(65) Prior Publication Data
US 2009/0079652 A1 Mar. 26, 2009

(30) Foreign Application Priority Data
Sep. 26, 2007 (JP) .............................. 2007-248674

(51) Int. Cl.
*H01Q 7/08* (2006.01)
(52) U.S. Cl. .................... 343/788; 343/850; 340/447
(58) Field of Classification Search ................ 343/778, 343/702, 850, 711, 713; 340/447, 442, 445
See application file for complete search history.

(56) References Cited

U.S. PATENT DOCUMENTS
6,940,461 B2* 9/2005 Nantz et al. ................. 343/713
7,145,445 B2* 12/2006 Tranchina ................... 340/447
7,195,717 B2* 3/2007 Ishida et al. .............. 252/62.62

FOREIGN PATENT DOCUMENTS
| JP | A-08-102613 | 4/1996 |
| JP | A-11-340734 | 12/1999 |
| JP | A-2001-191768 | 7/2001 |
| JP | A-2005-045298 | 2/2005 |
| JP | A-2005-132169 | 5/2005 |
| JP | A-2007-043257 | 2/2007 |

* cited by examiner

*Primary Examiner*—Hoang V Nguyen
(74) *Attorney, Agent, or Firm*—Oliff & Berridge, PLC (57) ABSTRACT

A portable remote controller for a tire status detector, includes a portable casing, a transmission circuit disposed in the casing, a low-pass filter disposed at an output side of the transmission circuit for permitting a signal with a frequency of not more than the first frequency to pass through the low-pass filter, a receiving circuit disposed in the casing, a high-pass filter disposed at an input side of the receiving circuit for permitting a signal with a frequency of not less than the second frequency to pass through the high-pass filter, a ferrite bar antenna housed in the casing and having a ferrite bar wound with an antenna coil, the antenna coil having two terminals, one of which being connected to the ground and the other being connected in common to the low-pass and high-pass filers and a duplexer composed of the low-pass and high-pass filters. The ferrite bar antenna is used both for transmission of the long wave signals and for receipt of the ultra high frequency signals.

12 Claims, 13 Drawing Sheets

PORTABLE REMOTE CONTROLLER FOR TIRE STATUS DETECTOR

BACKGROUND OF THE INVENTION

1. Field of the Invention

The present invention relates to a portable remote controller for wirelessly operating a tire status detector mounted on a wheel of an automotive vehicle or the like.

2. Description of the Related Art

A tire status detector usually uses, as a trigger, reception of a long wave signal with a wavelength of, for example, 125 kHz from a controller fixed to a vehicle body. The tire status detector then detects air pressure of a tire. A result of detection is returned, included in an ultra high frequency (UHF) signal with a wavelength of, for example, 315 MHz to the controller. Furthermore, a portable remote controller for radio-controlling a tire status detector at a location remote from a vehicle has been developed. The portable remote controller comprises a transmission antenna such as ferrite bar antenna and a receiving antenna such as loop antenna. An operation button is operated so that a long wave signal with a wavelength of 125 kHz is transmitted from the remote controller. The remote controller receives a UHF signal with a wavelength of 315 MHz from the tire status detector. See JP-A-2001-191768 and JP-A-2005-132169.

However, the aforesaid conventional portable remote controller for the tire status detector has a size inconvenient to carrying purposes. Accordingly, the portable remote controller has necessitated a size reduction.

SUMMARY OF THE INVENTION

The present invention was made in view of the foregoing circumstances, and therefore, an object of the present invention is to provide a portable remote controller for the tire status detector, which can realize a size reduction.

The present invention provides a portable remote controller for a tire status detector, which transmits a long wave signal with a first frequency to the tire status detector mounted on a wheel so that air pressure of a tire is detected, and which receives an ultra high frequency signal with a second frequency from the tire status detector, thereby displaying a result of detection of the tire air pressure included in the ultra high frequency signal. The portable remote controller comprises a portable casing, a transmission circuit provided in the casing and having an output side, a low-pass filter provided at the output side of the transmission circuit for permitting only a signal with a frequency of not more than the first frequency to pass therethrough, a receiving circuit provided in the casing and having an input side, a high-pass filter provided at the input side of the receiving circuit for permitting only a signal with a frequency of not less than the second frequency to pass therethrough, a ferrite bar antenna housed in the casing and having a ferrite bar wound with an antenna coil, the antenna coil having two terminals, one of which being connected to the ground and the other being connected in common to the low-pass and high-pass filers and a duplexer composed of the low-pass and high-pass filters. The ferrite bar antenna is used both for transmission of the long wave signals and for receipt of the ultra high frequency signals.

The duplexer is comprised of the low-pass filter provided at the output side of the transmission circuit and the high-pass filter provided at the input side of the receiving circuit. One of the terminals of the antenna coil is grounded and the other terminal of the antenna coil is connected in common to the low-pass and high-pass filters. Since the ferrite bar antenna can be used both for transmission of the long wave signals and for receipt of the ultra high frequency signals, the portable remote controller can be rendered smaller in size as compared with the conventional remote controllers.

When a matching circuit is connected so as to bypass between an intermediate position of the antenna coil and the duplexer side end of the antenna coil, one end of the antenna coil, namely, a part of the coil from the intermediate position to the duplexer side end of the antenna coil can be defined so as to have a shorter coil length suitable for receiving a second frequency signal. Consequently, the ultra high frequency signal with the second frequency which has been received at the one end of the antenna coil can be prevented from being deteriorated at the remaining part of the antenna coil. Furthermore, since one end of the antenna coil is matched with the duplexer at the second frequency by the matching circuit, the receiver sensitivity for the ultra high frequency signal with the second frequency can be increased.

Furthermore, the antenna coil is divided into a longer axis coil constituting a part thereof and wound about a longer axis of the ferrite bar and a shorter axis coil constituting another part thereof and wound about a shorter axis of the ferrite bar. As a result, each coil can be composed into a structure suitable for either transmission of the long wave signal or receipt of the ultra high frequency signal. More specifically, the longer axis coil is wound about the longer axis of the ferrite bar so that the longer axis coil can have a relatively larger number of coil turns. Consequently, magnetic flux contained in the long wave signal with the first frequency can be increased in intensity. On the other hand, the shorter axis coil is wound about a shorter axis of the ferrite bar. Consequently, the shorter axis coil has an increased area inside through which radio waves pass and accordingly, the receiver sensitivity can further be improved.

Still furthermore, a gap defining member is provided for covering an outer surface of the ferrite bar inside the antenna coil. Accordingly, when the antenna coil is withdrawn from the outer face of the ferrite bar, a floating capacitance component can be suppressed between the antenna coil and the ferrite bar, whereupon the receiver sensitivity for the ultra high frequency signal can be improved.

Additionally, a coil axis of the antenna coil of the ferrite bar antenna maybe disposed substantially in parallel with a human body contact face of an operation switch provided on an outer surface of the casing. As a result, when the operation switch is operated by a finger, the ferrite bar antenna and the finger come close to each other, the energy of ultra high frequency wave with the second frequency is collected with the human body serving as an antenna, and the collected energy can be supplied through the ferrite bar antenna to the receiving circuit.

BRIEF DESCRIPTION OF THE DRAWINGS

Other objects, features and advantages of the present invention will become clear upon reviewing the following description of the embodiment with reference to the accompanying drawings, in which.

DETAILED DESCRIPTION OF THE INVENTION

Figure 1:
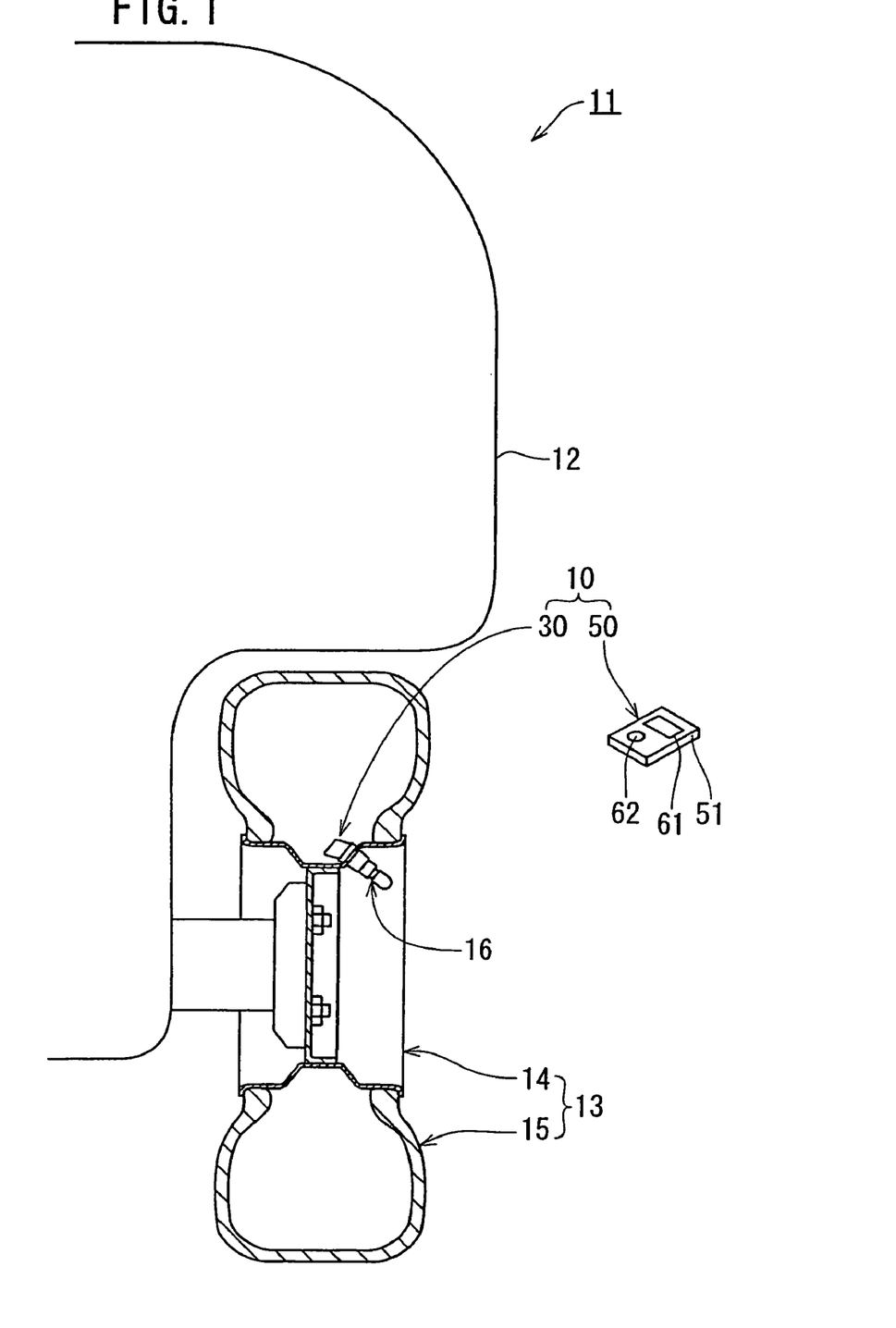
FIG. 1 is a conceptual diagram showing a tire monitor system in accordance with one embodiment of the present invention.

One embodiment of the present invention will be described with reference to FIGS. 1 to 6. Referring first to FIG. 1, a tire monitor system 10 is shown which comprises a tire status detector 30 and a portable remote controller 50 of the embodiment. The tire status detector 30 is mounted on each of tired wheels 13 of a vehicle 11 although FIG. 1 shows only one tired wheel 13.

Figure 2:
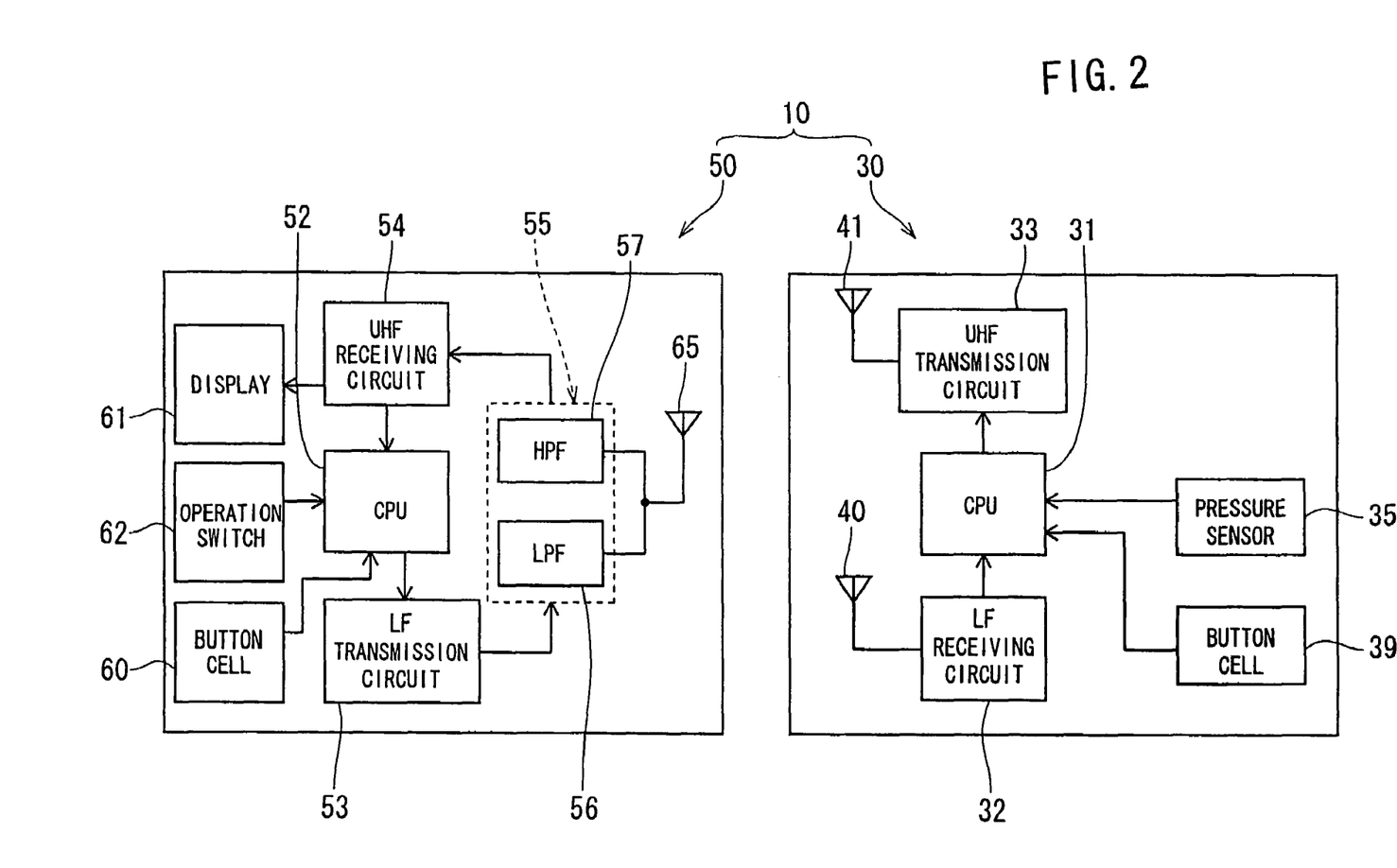
FIG. 2 is a block diagram showing an electrical arrangement of the tire monitor system.

The tire status detector 30 is fixed to a proximal end of a tire valve 16 mounted to a wheel 14 so as to be disposed inside a tire 15. The tire status detector 30 comprises a central processing unit (CPU) 31, a low frequency (LF) receiving circuit 32, an ultra high frequency (UHF) transmission circuit 33, a button cell 39, a pressure sensor 35, a receiving ferrite bar antenna 40 and a transmission loop antenna 41, as shown in FIG. 2.

Figure 3:
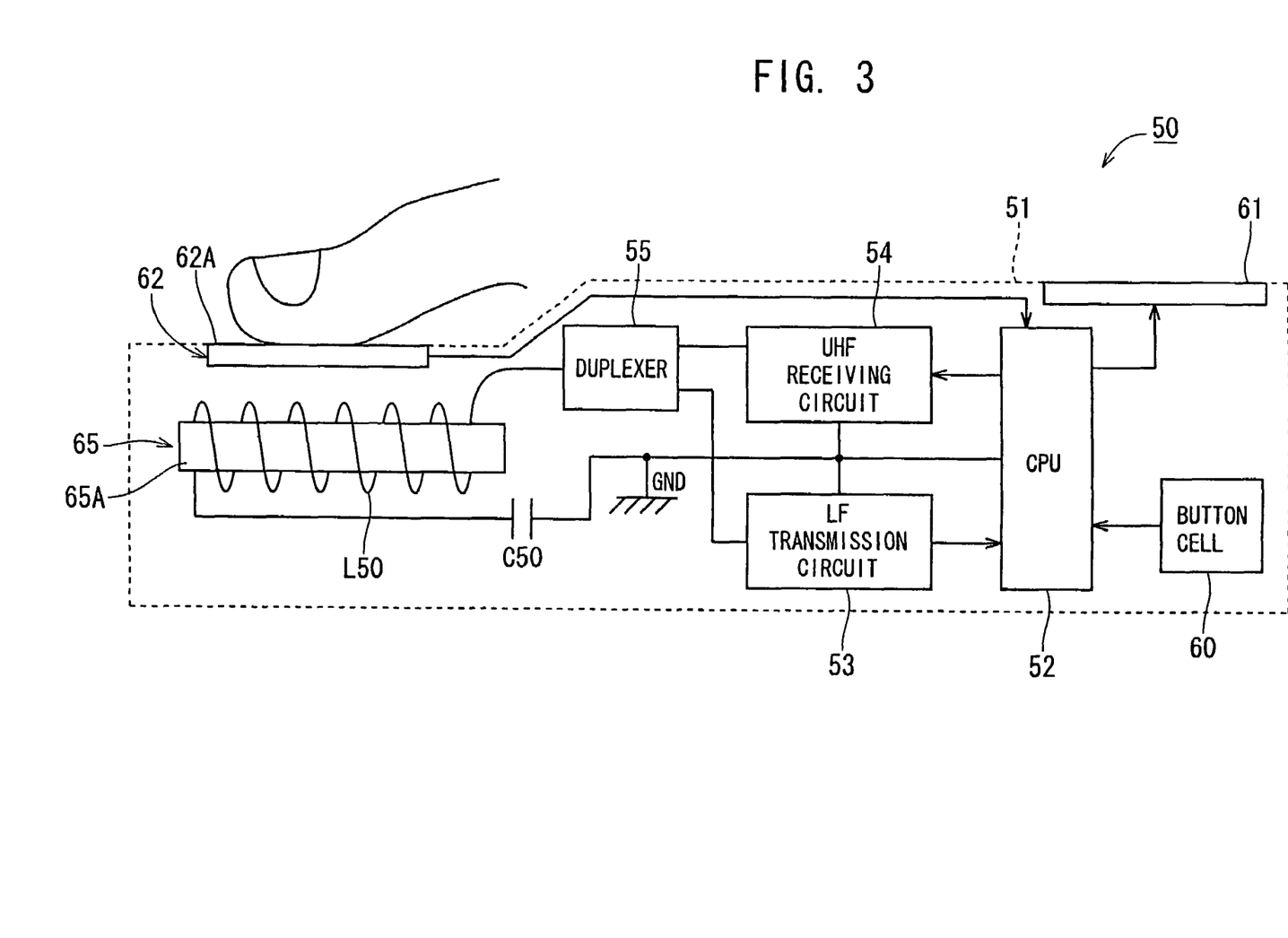
FIG. 3 is a conceptual diagram showing a portable remote controller.

On the other hand, the portable remote controller 50 comprises a button cell 60, a CPU 52, an LF transmission circuit 53, a UHF receiving circuit 54, a duplexer 55 and a ferrite bar antenna 65, all of which are housed in a portable casing 51, as shown in FIG. 3. A display 61 and an operation switch 62 are provided on an outer surface of the casing 51. In the portable remote controller 50, the ferrite bar antenna 65 is used both for transmission of long wave signals and for receipt of ultra high frequency signals.

Figure 4:
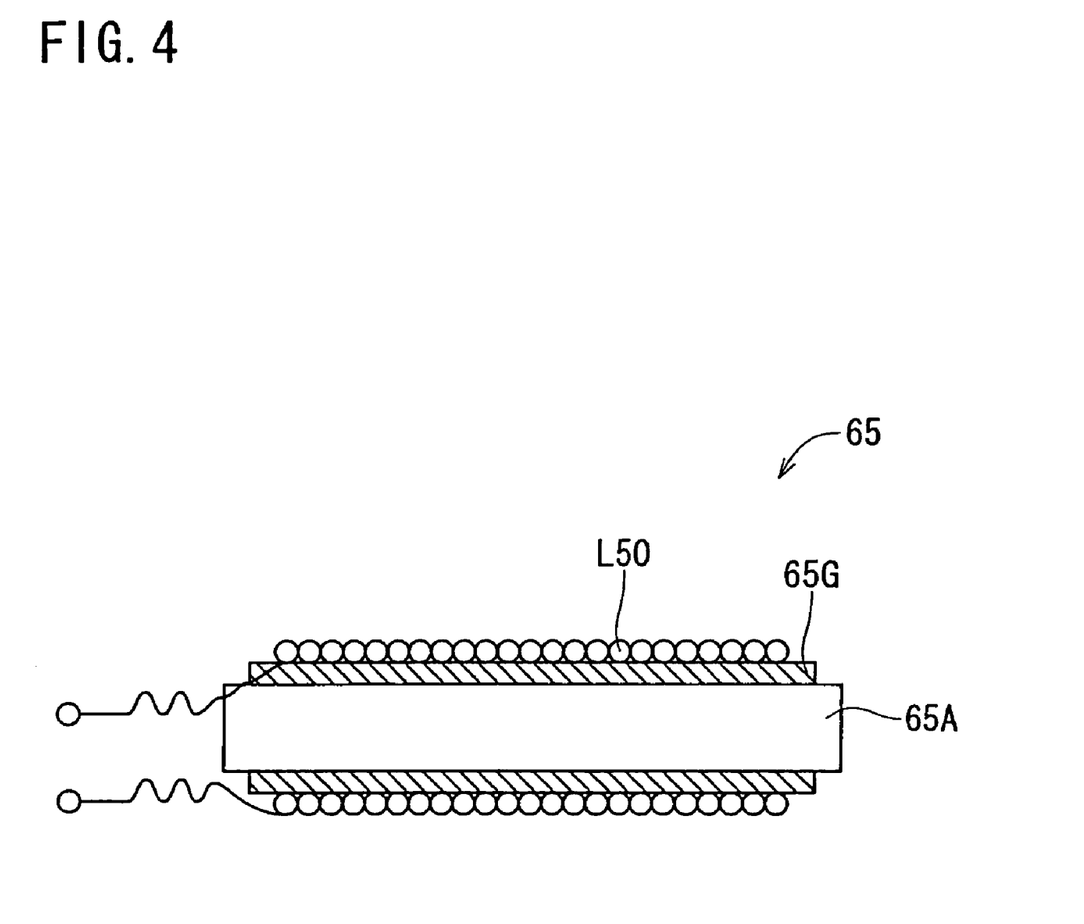
FIG. 4 is a sectional view of a ferrite bar antenna.

The ferrite bar antenna 65 includes a ferrite bar 65A and a gap defining member 65G covering an outer surface of the ferrite bar 65A, as shown in FIG. 4. An antenna coil L50 is wound on the gap defining member 65G. The gap defining member 65G is comprised of a non-conductor such as resin or paper. The ferrite bar 65A is formed into a generally cylindrical shape as shown in FIG. 3.

Figure 5:
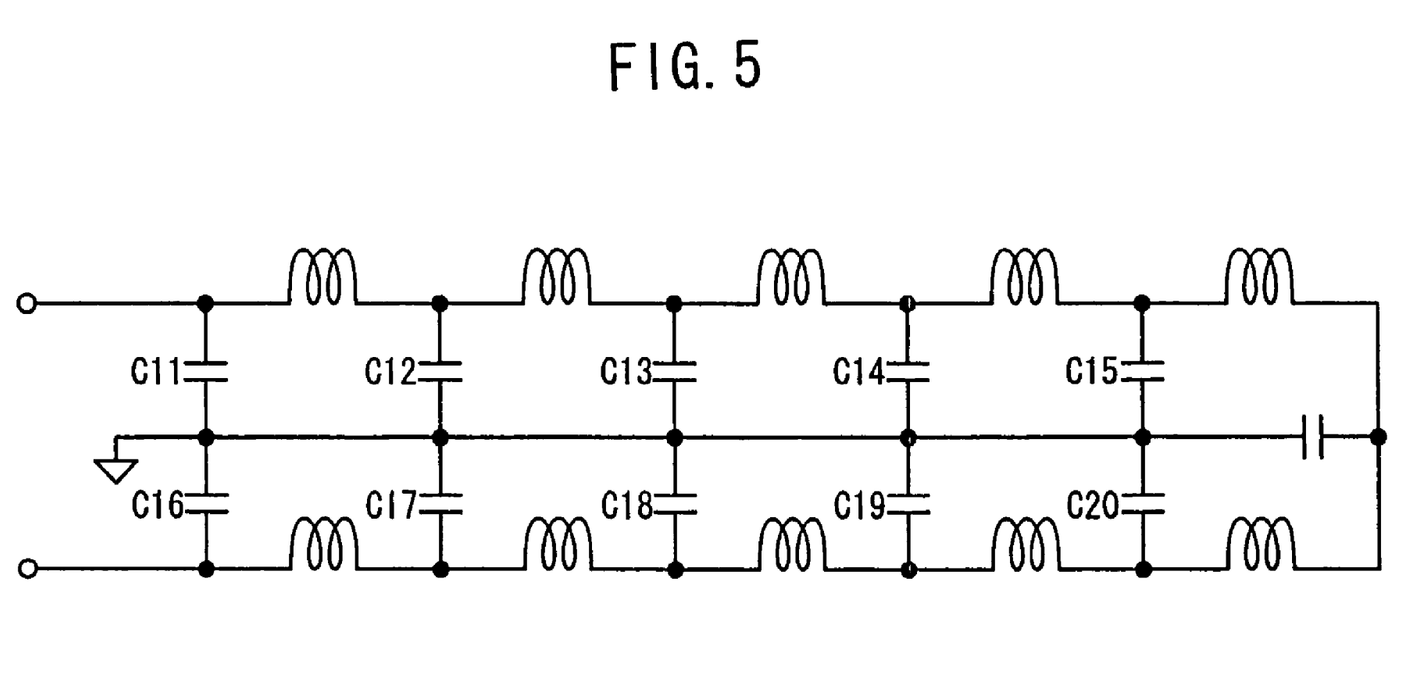
FIG. 5 is a diagram showing a distributed constant circuit of the ferrite bar antenna.

A ferrite material constituting the ferrite bar 65A also has a function of absorbing radio waves. Accordingly, the ferrite material can be regarded as an imaginary ground (GND) with respect to ultra high frequency (UHF) waves. Then, the ferrite bar antenna 65 constitutes a distributed constant circuit as shown in FIG. 5. When, for example, electric wires constituting the antenna coil L50 and the ferrite bar 65A come close to each other such that floating capacitances C11 to C20 are increased, the distributed constant circuit can serve as a low-pass filter which permits only extremely low frequency signals to pass therethrough. In the embodiment, the gap defining member 65G has a thickness set so that a sufficient distance is provided between the antenna coil L50 and the ferrite bar 65A thereby to reduce the floating capacitances C11 to C20 and so that the distributed constant circuit is composed so as to be resonatable at an ultra high frequency signal with a second frequency (315 MHz, for example) used for communication between the tire status detector 30 and the portable remote controller 50.

The antenna coil L50 has one of two terminals which is connected via an antenna resonant capacitor C50 to a ground (GND) as shown in FIG. 3. The antenna resonant capacitor C50 is set so as to be resonatable together with the antenna coil L50 relative to a long wave signal having a first frequency of, for example, 125 KHz, which is used for communication between the tire status detector 30 and the portable remote controller 50. Accordingly, when the UHF signal with the second frequency of, for example, 315 MHz is supplied, a section between both terminals of the antenna resonant capacitor C50 is rendered substantially conductive, whereupon the antenna resonant capacitor C50 is practically nought.

The antenna coil L50 and the antenna resonant capacitor C50 constitute an LC series resonant circuit. The LC series resonant circuit has both terminals between which output (3 V, for example) of the button cell 60 as described below is applied. However, since the LC series resonant circuit has an extremely high Q value, the voltage generated between both terminals of the antenna resonant capacitor C50 or antenna coil L50 can easily rise to or above 100 Vpp.

Figure 6:
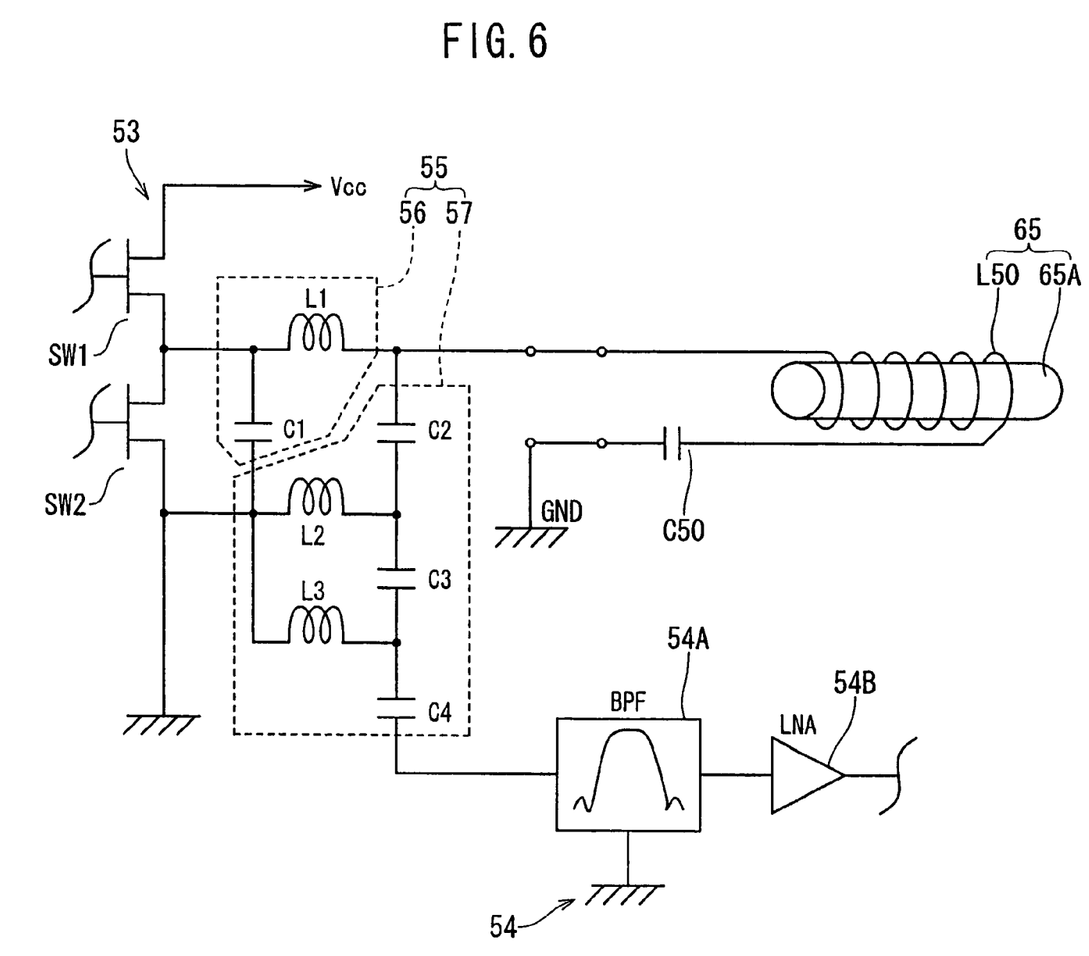
FIG. 6 is a circuit diagram showing a duplexer of the portable remote controller.

The antenna coil L50 has the other terminal which is connected via the duplexer 55 to the UHF receiving circuit 54 and the LF transmission circuit 53. The duplexer 55 comprises a low-pass filter 56 connected to an output side of the LF transmission circuit 53 and a high-pass filter 57 connected to an input side of the UHF receiving circuit 54, as shown in FIG. 6.

More specifically, the LF transmission circuit 53 includes first and second switch elements SW1 and SW2 serially connected between the output (Vcc) of the button cell 60 and GND. The UHF receiving circuit 54 is provided with a band-pass filter 54A and an amplifier 54B such as a low noise amplifier (LNA) at an input side thereof. The band-pass filter 54A permits the UHF signal with the second frequency (315 MHz, for example) to pass therethrough. The low-pass filter 56 comprises a low-pass filter capacitor C1 and a low-pass filter coil L1. The low-pass filter capacitor C1 is parallel-connected between the first switch element SW1 and GND together with the second switch element SW2 at the GND side of the LF transmission circuit 53. The low-pass filter coil L1 is connected between a common node of the first and second switch elements SW1 and SW2 and the terminal of the antenna coil L50. The low-pass filter 56 is arranged so as to permit only a signal with a frequency equal to or below the first frequency to pass therethrough.

The high-pass filter 57 comprises three high-pass filter capacitors C2, C3 and C4 series-connected between the terminal of the antenna coil L50 and the band-pass filter 54A. The high-pass filter 57 further comprises two high-pass filter coils L2 and L3 connected between a common node of the high-pass filter capacitors C2 and C3 (C3 and C4) adjacent to each other and GND. The high-pass filter 57 is arranged so as to permit only a signal with a frequency equal to or above the second frequency to pass therethrough. As a result, the UHF receiving circuit 54 is prevented from being applied with a signal having a high amplitude (100 Vpp, for example) for generation of the long wave signal with the first frequency which is smaller than the second frequency.

The operation switch 62 has a generally flat operation surface 62A (corresponding to a human body contact face in the present invention) as shown in FIG. 3. When the operation surface 62A is depressed, an ON signal is loaded into the CPU 52. The ferrite bar antenna 65 is disposed beneath the operation switch 62 so that a coil axis of the antenna coil L50 in the ferrite bar antenna 65 becomes substantially parallel to the operation surface 62A of the operation switch 62. A member (hereinafter, "constituent member") constituting a part of the operation switch 62 that is brought into contact with a human body is made of a conductor (semiconductor) having a higher electrical resistance than copper, iron or the like. The constituent member of the operation switch 62 has no electrical or magnetic effect on the long wave signal with the first frequency whose main component contains magnetic flux delivered from the ferrite bar antenna 65. However, the constituent member serves as a capacitor when a human body which has been exposed to the electric field contained in the UHF signal is brought into contact with the operation switch 62. Consequently, the energy of ultra high frequency waves collected by the human body serving as an antenna can be gathered around the ferrite bar antenna 65.

The following will describe the operation and effects of the embodiment. When using the portable remote controller 50, a driver can check the air pressure of the tire 15 before getting in the vehicle 11. For this purpose, the operation surface 62A of the operation switch 62 is depressed by a finger as shown in FIG. 3. The CPU 52 of the controller 50 then switches the switches SW1 and SW2 of the LF transmission circuit 53 alternately at the first frequency of, for example, 125 kHz. As a result, a voltage signal with the first frequency is applied between both ends of a series circuit comprising the ferrite bar antenna 65 and the antenna resonant capacitor C50, whereby the antenna coil L50 of the ferrite bar antenna 65 is excited such that a long wave signal with the first frequency is delivered from the ferrite bar antenna 65. The delivered long wave signal contains the magnetic flux as a principal component. In this case, the high-pass filter 57 provided between the antenna 65 and the UHF receiving circuit 54 prevents the voltage signal with the first frequency output by the LF transmission circuit 53 from being supplied to the UHF receiving circuit 54, whereby the UHF receiving circuit 54 is protected.

In the tire status detector 30, the ferrite bar antenna 40 receives the long wave signal (magnetic flux signal) with the first frequency from the portable remote controller 50, whereupon the CPU 31 is triggered thereby to carry out a predetermined program. A result of detection by the pressure sensor 35 is first retrieved. The detection result is modulated with a carrier wave with the second frequency (315 MHz, for example) by the UHF transmission circuit 33 into an ultra high frequency signal. The obtained ultra high frequency signal is delivered from the loop antenna 41 by radio.

When the ferrite bar antenna 65 of the portable remote controller 50 receives the ultra high frequency signal with the second frequency (315 MHz, for example), the distributed constant circuit (see FIG. 5) of the ferrite bar antenna 65 then resonates so that the UHF signal is retrieved through the high pass-filter 57 into the UHF receiving circuit 54. In this case, the human body also receives the UHF signal with the second frequency, serving as the antenna. Since the finger with which the driver operates the operation switch 62 stands close to the ferrite bar antenna 65, the surface electric field energy of the UHF signal collected onto the human body serving as the antenna is converted to magnetic field around the ferrite bar antenna 65, thereby being supplied via the ferrite bar antenna 65 and the high-pass filter 57 into the UHF receiving circuit 54. The UHF signal with the second frequency thus taken into the UHF receiving circuit 54 is demodulated by the UHF receiving circuit 54, so that information of air pressure of the tire 15 is extracted. The CPU 52 causes the display 61 to display the information of air pressure of the tire 15.

In the portable remote controller 50 of the tire status detector 30 in the foregoing embodiment, one of the terminals of the antenna coil L50 wound on the ferrite bar 65A of the ferrite bar antenna 65 is connected to GND, whereas the other terminal is connected in common to the low-pass filter 56 provided at the output side of the LF transmission circuit 53 and the high-pass filter 57 provided at the input side of the UHF receiving circuit 54. As a result, the ferrite bar antenna 65 can be used both for transmission of the long wave signal and receipt of the ultra high frequency signal, whereupon the portable remote controller 50 can be rendered smaller as compared with the conventional controllers. Furthermore, the floating capacitance component between the wires constituting the antenna coil L50 and the ferrite bar 65A is suppressed by the gap defining member 65G provided between the ferrite bar 65A and the antenna coil L50 so that the receiver sensitivity for the UHF signal can be improved. Additionally, the receiver sensitivity for the UHF signal can further be improved by using the human body as an auxiliary antenna for receiving the UHF signal.

Figure 7:
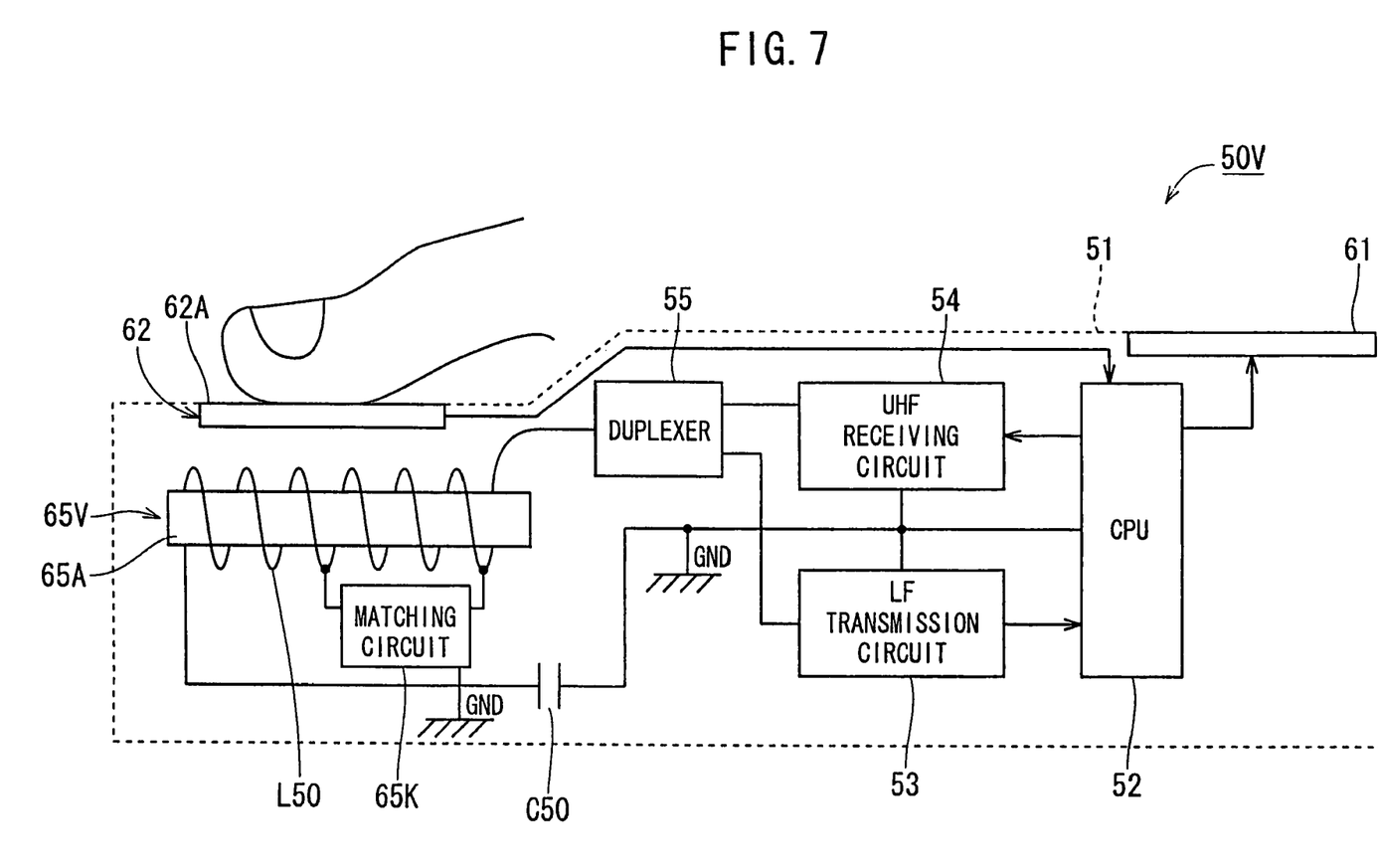
FIG. 7 is a conceptual diagram showing a portable remote controller of a second embodiment.
Figure 8:
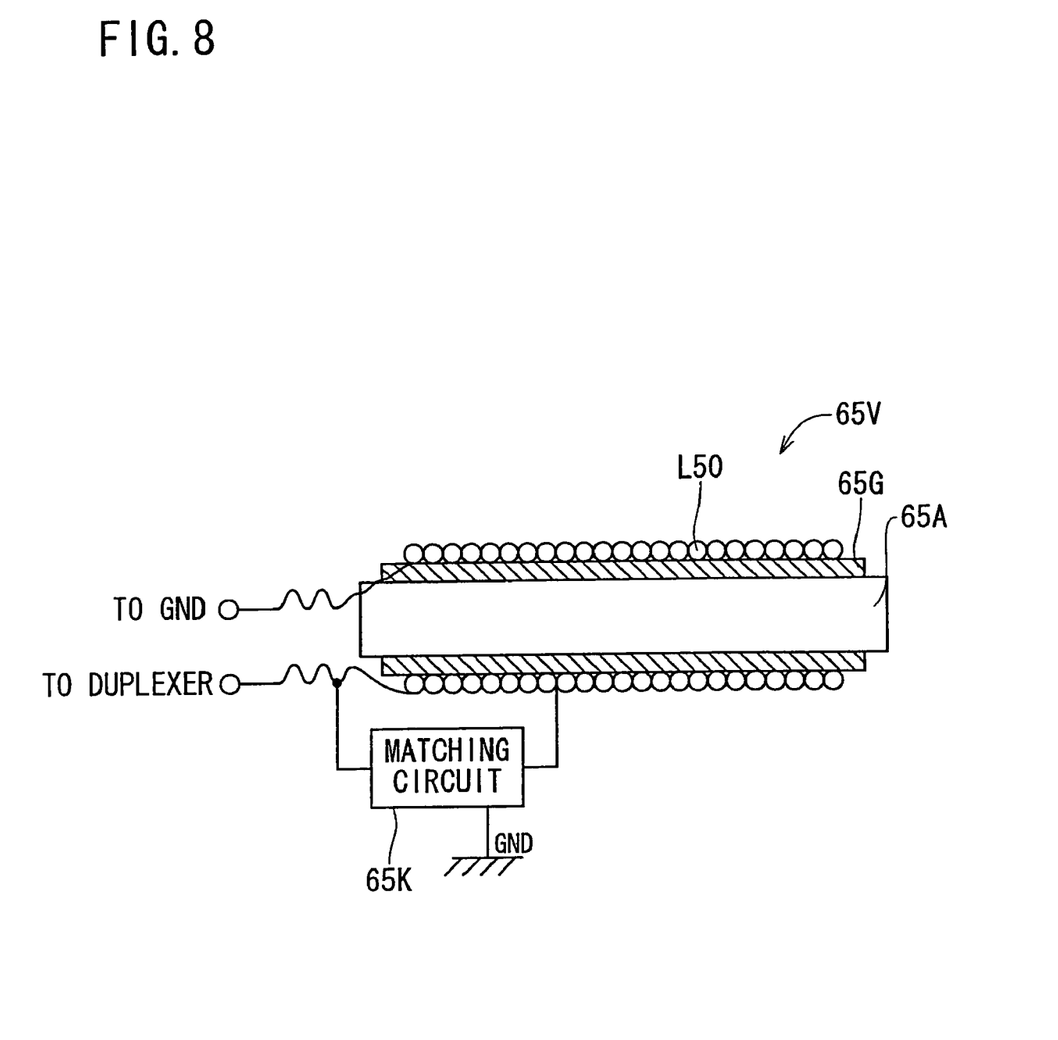
FIG. 8 is a sectional view of the ferrite bar antenna.
Figure 9A:
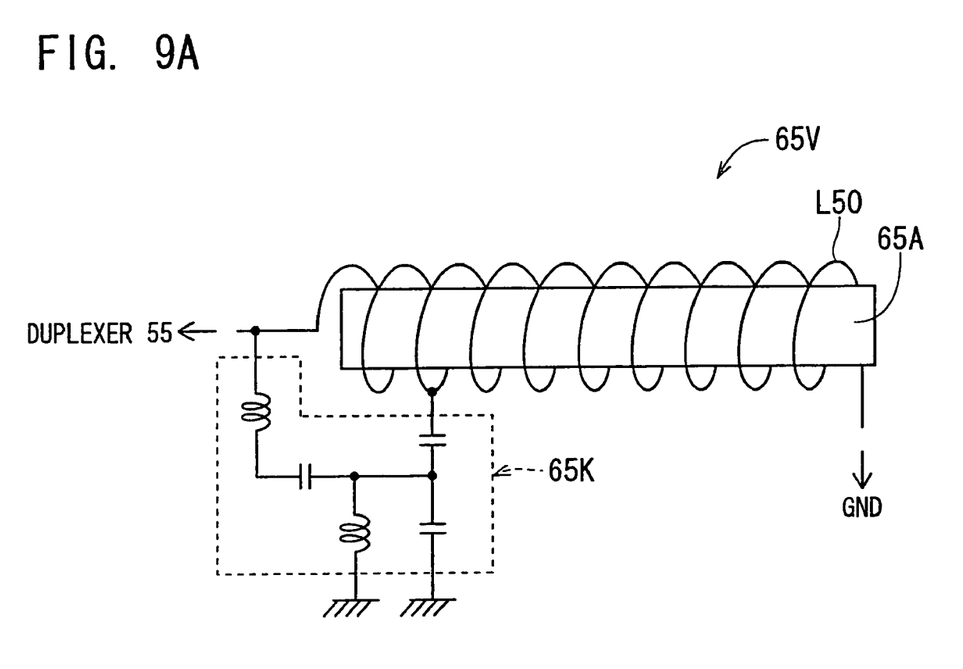
FIGS. 9A and 9B are electrical circuit diagrams showing a matching circuit.
Figure 9B:
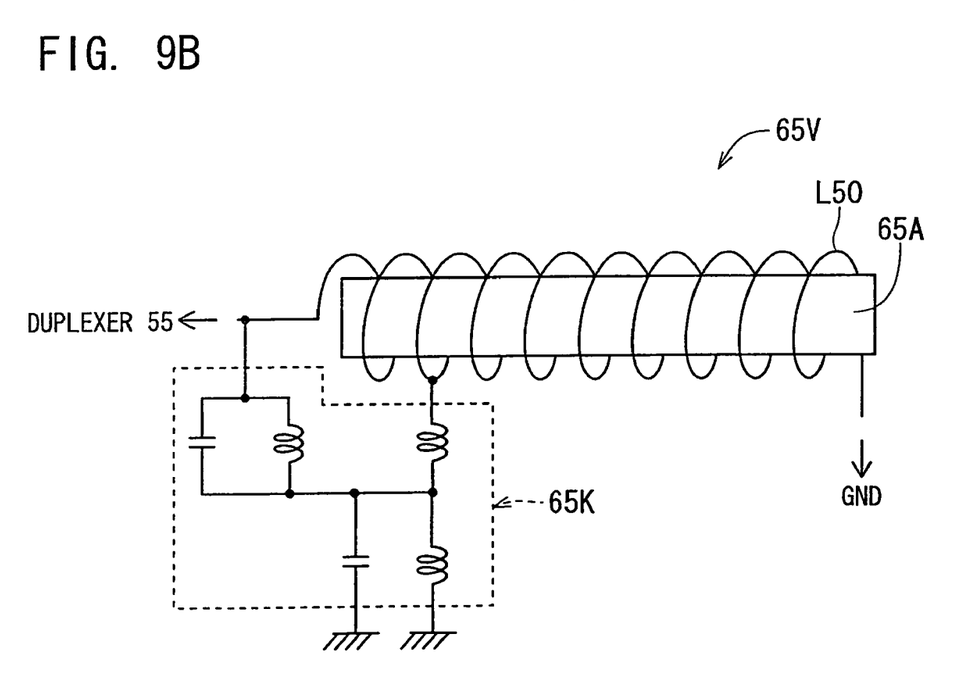

FIGS. 7 to 9 illustrate a second embodiment of the present invention. A portable remote controller 50V of the second embodiment differs from the controller 50 of the first embodiment in the arrangement of the ferrite bar antenna 65V as shown in FIGS. 7 and 8 in contrast to FIGS. 3 and 4 respectively. More specifically, a matching circuit 65K is connected to the ferrite bar antenna 65V so as to bypass a part of the coil between an intermediate position of the antenna coil L50 and the duplexer 55 side terminal of the antenna coil L50. The matching circuit 65K is arranged so as to 50-ohm-match the aforesaid coil part with the duplexer 55 at the second frequency.

According to the second embodiment, the matching circuit 65K is connected so as to bypass a part of the coil between an intermediate position of the antenna coil L50 and the duplexer 55 side terminal of the antenna coil L50. As a result, the antenna coil L50 can be divided so as to have the coil part from the intermediate position to the duplexer 55 side terminal thereof. The coil part has a shorter coil length suitable for receipt of the second frequency. Furthermore, the received UHF signal with the second frequency can be prevented from deterioration in the residual part of the antenna coil L50 due to an inductance component at the end of the antenna coil L50 and the floating capacitance distributed between the antenna coil L50 and the ferrite bar 65A. Furthermore, the receiver sensitivity for the UHF signal with the second frequency can be improved by 50-ohm matching the end of the antenna coil L50 with the duplexer 55 at the second frequency by the matching circuit 65K.

FIGS. 9A and 9B illustrate concrete arrangements of the matching circuit 65K.

Figure 10:
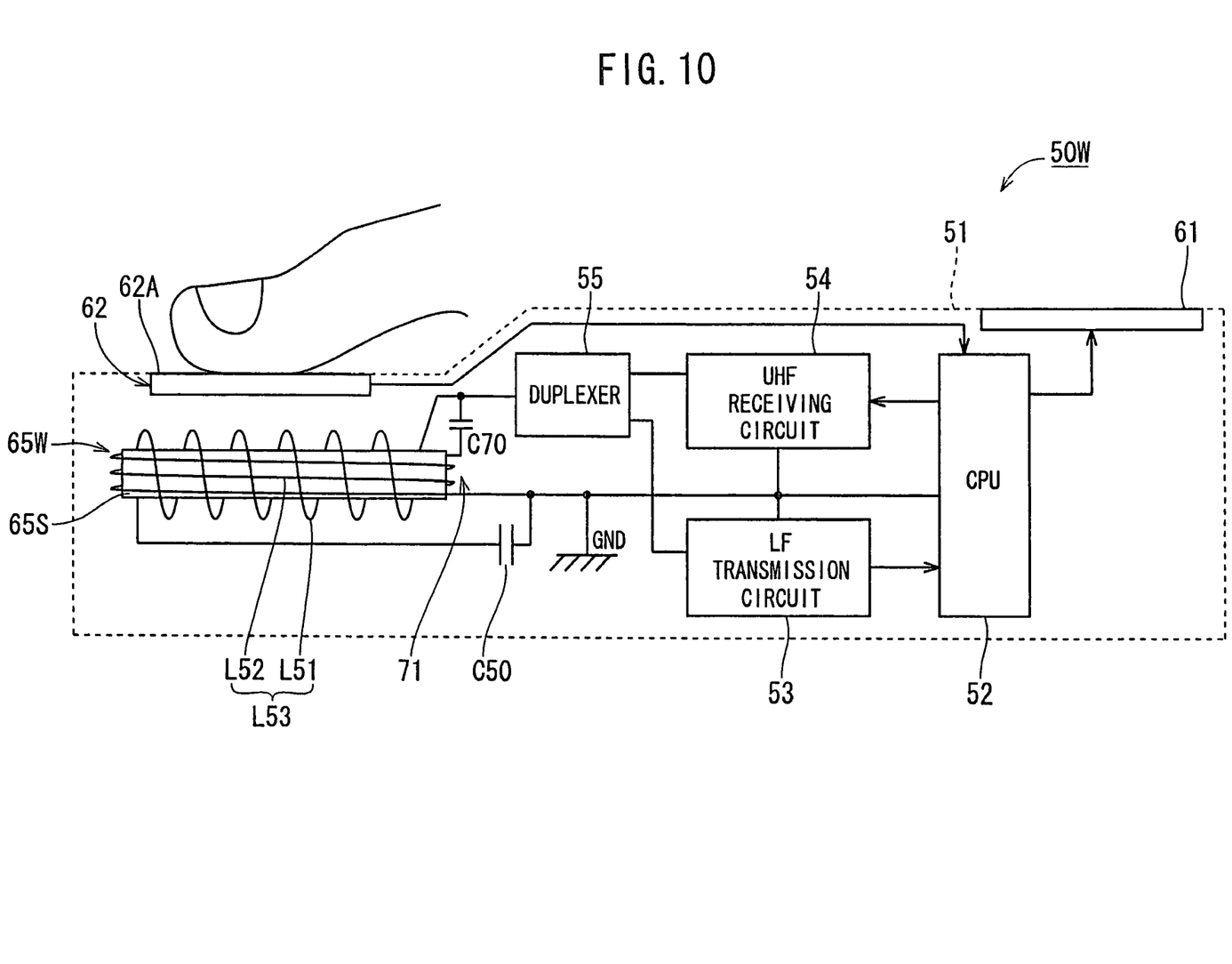
FIG. 10 is a conceptual diagram showing a portable remote controller of a third embodiment.
Figure 11:
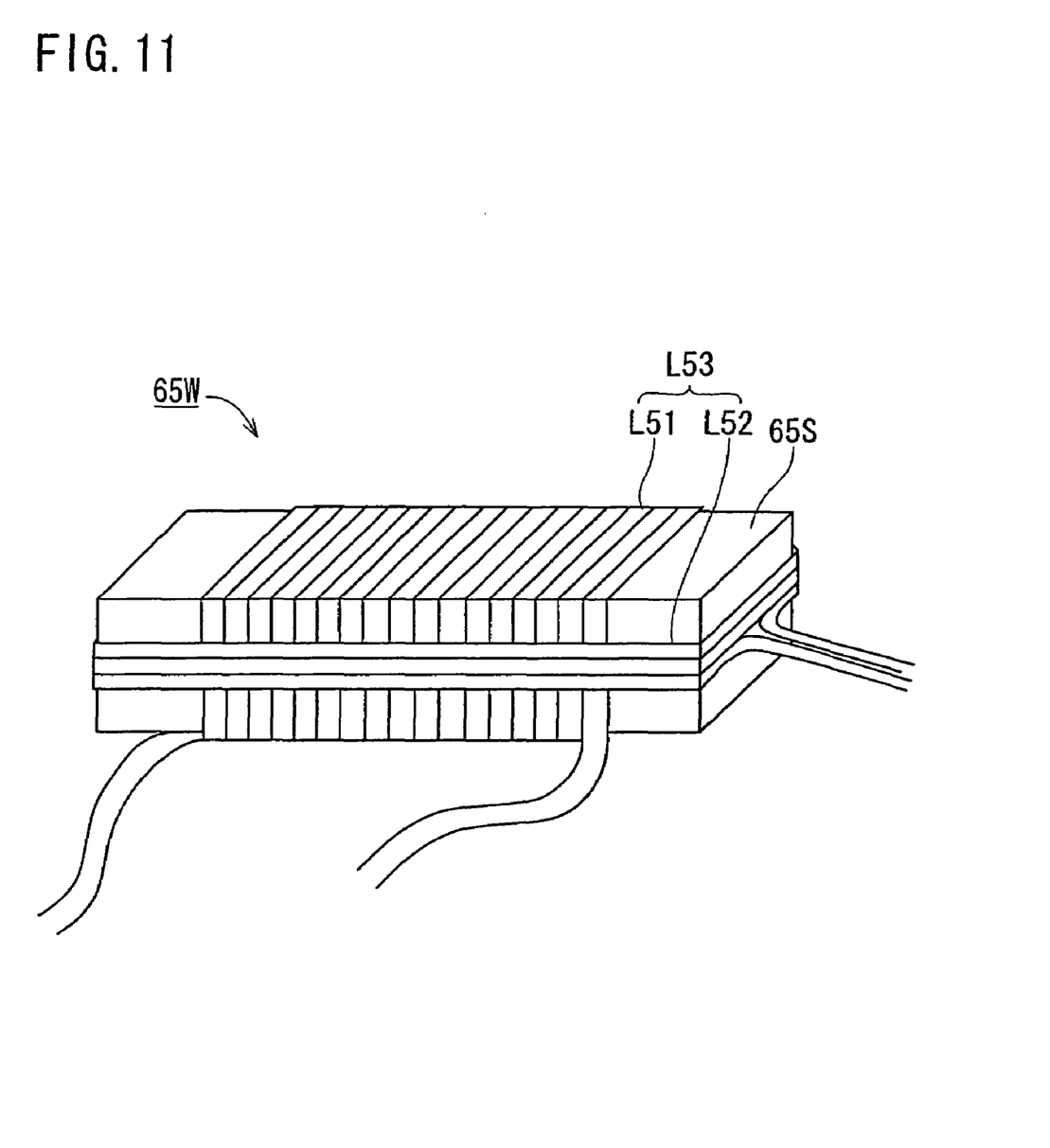
FIG. 11 is a perspective view of the ferrite bar antenna.
Figure 12:
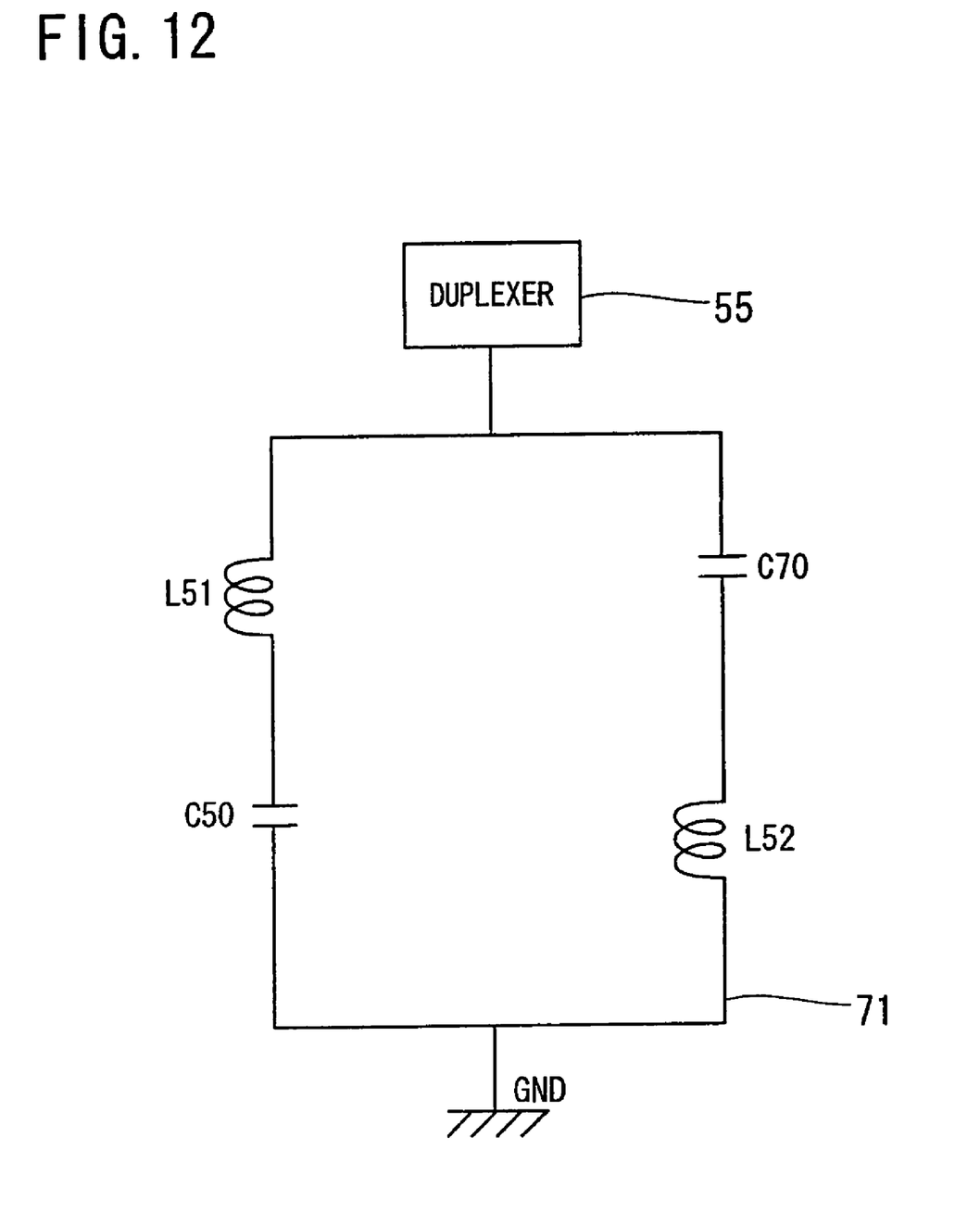
FIG. 12 is a circuit diagram showing a part of the portable remote controller.

FIGS. 10 to 12 show a third embodiment of the invention. A portable remote controller 50W of the third embodiment differs from the controller 50 of the first embodiment only in the arrangement of the ferrite bar antenna 65W, as shown in FIG. 10 in contrast to FIG. 3. More specifically, the ferrite bar antenna 65W of the third embodiment includes a ferrite bar 65S formed into the shape of a prism with a square section as shown in FIG. 11. Furthermore, the antenna coil L53 of the ferrite bar antenna 65W includes a longer axis coil L51 wound about a longer axis part of the ferrite bar 65S and a shorter axis coil L52 wound about a shorter axis part of the ferrite bar 65S. The capacitor C70 and the shorter axis coil L52 constitute an LC series circuit 71 as shown in FIGS. 10 and 12. The LC series circuit 71 and the longer axis coil L51 are parallel connected between the GND and the duplexer 55 including the low-pass and high-pass filters 56 and 57. The capacitance of the capacitor C70 is set so that the capacitor 70 is substantially cut off between both terminals when the long wave signal with the first frequency is supplied and so that the capacitor 70 is substantially conductive between the terminals when the UHF signal with the second frequency is supplied.

The shorter axis coil L52 has a smaller number of turns and smaller inductance. Accordingly, when the long wave signal with the first frequency is supplied, the shorter axis coil L52 is substantially short-circuited between both terminals thereof. Accordingly, without provision of the capacitor C70, the shorter axis coil L52 also causes the longer axis coil L51 to be substantially short-circuited between both terminals of the coil L51 when the long wave signal with the first frequency is supplied.

According to the third embodiment, the antenna coil L53 is divided into the longer axis coil L51 and the shorter axis coil L52. Accordingly, each of the coils L51 and L52 can be configured so as to be suitable for either transmission of the long wave signal or receipt of the UHF signal. More specifically, regarding the longer axis coil L51, a relatively larger number of turns can be wound about the longer axis part of the ferrite bar 65S, whereupon the intensity of magnetic flux contained in the long wave signal with the first frequency can be improved. On the other hand, since the shorter axis coil L52 is wound about the shorter axis part of the ferrite bar 65S, an area of the inside of the shorter axis coil L52 through which the magnetic flux of a radio wave passes can be increased. Furthermore, the shorter coil length renders the matching at the second frequency of 315 MHz, for example, easier, whereupon the receiver sensitivity can be improved.

The invention should not be limited to the above-described embodiments. Embodiments described below can fall within the technical scope of the invention. The embodiments may further be modified into forms other than described as follows without departing from the gist.

(1) The ferrite bar 65A in the first embodiment may be prismatic although the bar is cylindrical (see FIG. 6).

(2) The tire status detector 30 in the first embodiment is provided with the ferrite bar antenna 40 and the loop antenna 41 for the signal transmission and the signal receipt respectively. However, a single ferrite bar antenna 40 may be used both for signal transmission and for signal receipt in the tire status detector 30 in the same manner as in the portable remote controller 50, instead.

(3) Although the antenna resonant capacitor C50 is connected between the antenna coil L50 and GND in each foregoing embodiment, the capacitor C50 may be connected between the antenna coil L50 and the duplexer 55, instead.

Figure 13:
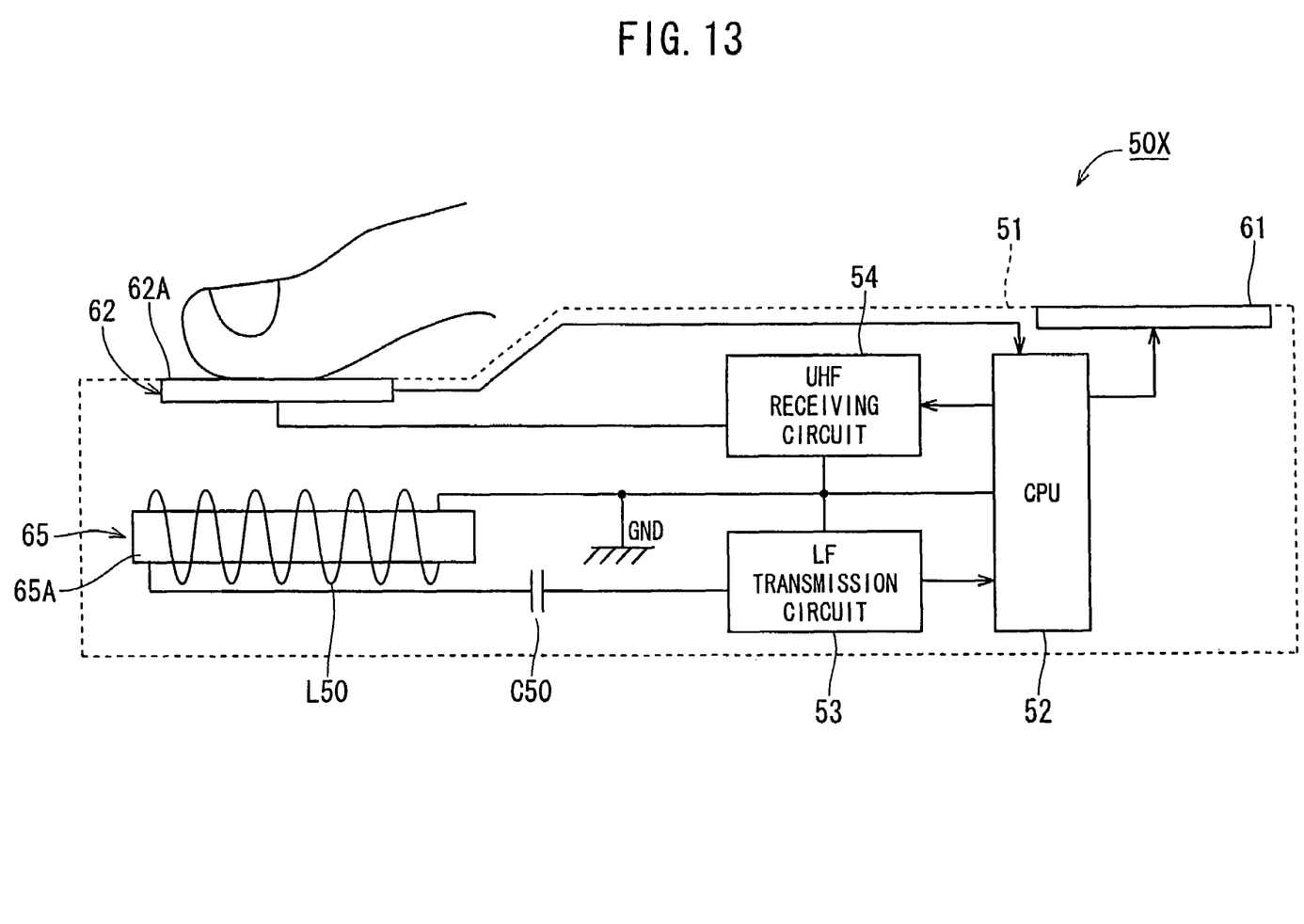
FIG. 13 is a conceptual diagram of a portable remote controller of a modified form.

(4) Although not within the technical scope of the invention, the ferrite bar antenna 65 may be connected only to the antenna coil L50 as a portable remote controller 50X shown in FIG. 13 by application of the technique in the first embodiment so that the potential difference between the operation switch 62 and GND is supplied to the UHF receiving circuit 54. Consequently, the UHF signal with the second frequency of 315 MHz, for example can be received by using the human body as an antenna.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

What is claimed is:

1. A portable remote controller for a tire status detector, which transmits a long wave signal with a first frequency to the tire status detector mounted on a wheel so that air pressure of a tire is detected, and which receives an ultra high frequency signal with a second frequency from the tire status detector, thereby displaying a result of detection of the tire air pressure contained in the ultra high frequency signal, the portable remote controller comprising:
   a portable casing;
   a transmission circuit provided in the casing and having an output side;
   a low-pass filter provided at the output side of the transmission circuit for permitting only a signal with a frequency of not more than the first frequency to pass therethrough;
   a receiving circuit provided in the casing and having an input side;
   a high-pass filter provided at the input side of the receiving circuit for permitting only a signal with a frequency of not less than the second frequency to pass therethrough;
   a ferrite bar antenna housed in the casing and having a ferrite bar wound with an antenna coil, the antenna coil having two terminals, one of which being connected to the ground and the other being connected in common to the low-pass and high-pass filers; and
   a duplexer composed of the low-pass and high-pass filters, wherein the ferrite bar antenna is used both for transmission of the long wave signals and for receipt of the ultra high frequency signals.

2. The portable remote controller according to claim 1, wherein the antenna coil has an intermediate position and a coil part from the intermediate position to the duplexer side terminal thereof, the controller further comprising a matching circuit which is connected so as to bypass between the intermediate position of the antenna coil and the duplexer side terminal of the antenna coil, the matching circuit matching the coil part of the antenna coil with the duplexer at the second frequency.

3. The portable remote controller according to claim 2, further comprising a gap defining member covering an outer surface of the ferrite bar inside the antenna coil.

4. The portable remote controller according to claim 3, further comprising an operation switch provided on an outer surface of the casing for delivering the long wave signal, and a human body contact face which is provided on the operation switch so as to be disposed substantially in parallel with a coil axis of the antenna coil of the ferrite bar antenna.

5. The portable remote controller according to claim 2, further comprising an operation switch provided on an outer surface of the casing for delivering the long wave signal, and a human body contact face which is provided on the operation switch so as to be disposed substantially in parallel with a coil axis of the antenna coil of the ferrite bar antenna.

6. The portable remote controller according to claim 1, wherein the ferrite bar has a prismatic shape and includes a longer axis part and a shorter axis part, and the antenna coil includes a longer axis coil constituting a part thereof and wound about the longer axis part of the ferrite bar and a shorter axis coil constituting another part thereof and wound about the shorter axis part of the ferrite bar, the shorter axis coil being capable of matching the duplexer at the second frequency, the portable remote controller further comprising an LC series circuit parallel-connected with the shorter axis coil and a capacitor, the LC series circuit series-connected with the longer axis coil between a ground and the duplexer.

7. The portable remote controller according to claim 6, further comprising a gap defining member covering an outer surface of the ferrite bar inside the antenna coil.

8. The portable remote controller according to claim 7, further comprising an operation switch provided on an outer surface of the casing for delivering the long wave signal, and a human body contact face which is provided on the operation switch so as to be disposed substantially in parallel with a coil axis of the antenna coil of the ferrite bar antenna.

9. The portable remote controller according to claim 6, further comprising an operation switch provided on an outer surface of the casing for delivering the long wave signal, and a human body contact face which is provided on the operation switch so as to be disposed substantially in parallel with a coil axis of the antenna coil of the ferrite bar antenna.

10. The portable remote controller according to claim 1, further comprising a gap defining member covering an outer surface of the ferrite bar inside the antenna coil.

11. The portable remote controller according to claim 10, further comprising an operation switch provided on an outer surface of the casing for delivering the long wave signal, and a human body contact face which is provided on the operation switch so as to be disposed substantially in parallel with a coil axis of the antenna coil of the ferrite bar antenna.

12. The portable remote controller according to claim 1, further comprising an operation switch provided on an outer surface of the casing for delivering the long wave signal, and a human body contact face which is provided on the operation switch so as to be disposed substantially in parallel with a coil axis of the antenna coil of the ferrite bar antenna.

* * * * *